(12) United States Patent
Uppala

(10) Patent No.: US 8,886,647 B2
(45) Date of Patent: *Nov. 11, 2014

(54) HIERARCHY OF SERVERS FOR QUERY PROCESSING OF COLUMN CHUNKS IN A DISTRIBUTED COLUMN CHUNK DATA STORE

(75) Inventor: Radha Krishna Uppala, Bellevue, WA (US)

(73) Assignee: Google Inc., Mountain View, CA (US)

( * ) Notice: Subject to any disclaimer, the term of this patent is extended or adjusted under 35 U.S.C. 154(b) by 199 days.

This patent is subject to a terminal disclaimer.

(21) Appl. No.: 12/939,815

(22) Filed: Nov. 4, 2010

(65) Prior Publication Data

US 2011/0055215 A1    Mar. 3, 2011

Related U.S. Application Data

(63) Continuation of application No. 11/311,825, filed on Dec. 19, 2005, now Pat. No. 7,860,865.

(51) Int. Cl.
*G06F 7/00* (2006.01)
*G06F 17/30* (2006.01)

(52) U.S. Cl.
CPC .... *G06F 17/30445* (2013.01); *G06F 17/30545* (2013.01)
USPC ............ 707/737; 707/802; 707/812; 707/803

(58) Field of Classification Search
CPC .................. G06F 17/30445; G06F 17/30545; G06F 17/30283; G06F 17/30312; G06F 17/30584

See application file for complete search history.

(56) References Cited

U.S. PATENT DOCUMENTS

| | | | |
|---|---|---|---|
| 5,502,811 A | 3/1996 | Ripberger | |
| 5,560,005 A | 9/1996 | Hoover | |
| 5,657,468 A | 8/1997 | Stallmo | |
| 5,768,532 A | 6/1998 | Megerian | |
| 5,794,229 A | 8/1998 | French | |
| 5,845,279 A | 12/1998 | Garofalakis | |
| 5,870,739 A | 2/1999 | Davis | |
| 5,903,887 A | 5/1999 | Kleewein | |
| 5,907,837 A * | 5/1999 | Ferrel et al. | 707/999.003 |
| 6,067,548 A | 5/2000 | Cheng | |
| 6,131,095 A | 10/2000 | Low | |

(Continued)

OTHER PUBLICATIONS

Office Action for U.S. Appl. No. 11/309,958, Jul. 8, 2010.

(Continued)

*Primary Examiner* — Fred I Ehichioya
*Assistant Examiner* — Jau-Shya Meng
(74) *Attorney, Agent, or Firm* — Fish & Richardson P.C.

(57) ABSTRACT

An improved system and method for query processing in a distributed column chunk data store is provided. A distributed column chunk data store may be provided by multiple storage servers operably coupled to a network. A storage server provided may include a database engine for partitioning a data table into the column chunks for distributing across multiple storage servers, a storage shared memory for storing the column chunks during processing of semantic operations performed on the column chunks, and a storage services manager for striping column chunks of a partitioned data table across multiple storage servers. Query processing may be performed by storage servers or query processing servers operably coupled by a network to storage servers in the column chunk data store. To do so, a hierarchy of servers may be dynamically determined to process execution steps of a query transformed for distributed processing.

19 Claims, 10 Drawing Sheets

(56) References Cited

U.S. PATENT DOCUMENTS

| | | | |
|---|---|---|---|
| 6,151,641 | A | 11/2000 | Herbert |
| 6,356,892 | B1 | 3/2002 | Corn |
| 6,449,730 | B2 * | 9/2002 | Mann et al. ............. 709/201 |
| 6,694,306 | B1 | 2/2004 | Nishizawa |
| 6,990,470 | B2 | 1/2006 | Hogan |
| 7,174,293 | B2 | 2/2007 | Kenyon |
| 7,308,532 | B1 | 12/2007 | Wood |
| 7,315,958 | B1 | 1/2008 | Bridge |
| 7,447,839 | B2 | 11/2008 | Uppala |
| 7,447,865 | B2 | 11/2008 | Uppala |
| 7,457,935 | B2 | 11/2008 | Uppala |
| 7,464,247 | B2 | 12/2008 | Uppala |
| 7,546,321 | B2 | 6/2009 | Uppala |
| 7,587,569 | B2 | 9/2009 | Uppala |
| 2002/0091715 | A1 | 7/2002 | Coady |
| 2002/0120763 | A1 | 8/2002 | Miloushev |
| 2002/0152293 | A1 | 10/2002 | Hahn |
| 2002/0174295 | A1 | 11/2002 | Ulrich |
| 2002/0194157 | A1 | 12/2002 | Zait |
| 2003/0028509 | A1 * | 2/2003 | Sah et al. ............. 707/1 |
| 2003/0074348 | A1 | 4/2003 | Sinclair et al. |
| 2003/0187864 | A1 | 10/2003 | McGoveran |
| 2003/0217033 | A1 | 11/2003 | Sandler |
| 2003/0220951 | A1 | 11/2003 | Muthulingam |
| 2004/0003086 | A1 | 1/2004 | Parham |
| 2004/0153479 | A1 | 8/2004 | Mikesell |
| 2005/0015546 | A1 | 1/2005 | Zohar |
| 2005/0187977 | A1 | 8/2005 | Frost |
| 2005/0210082 | A1 | 9/2005 | Shutt |
| 2005/0216428 | A1 | 9/2005 | Yagawa |
| 2006/0089935 | A1 | 4/2006 | Clifford |
| 2006/0107096 | A1 | 5/2006 | Findleton |
| 2007/0143248 | A1 | 6/2007 | Uppala |
| 2007/0143259 | A1 | 6/2007 | Uppala |
| 2007/0143274 | A1 | 6/2007 | Uppala |
| 2007/0143311 | A1 | 6/2007 | Uppala |
| 2007/0143369 | A1 | 6/2007 | Uppala |

OTHER PUBLICATIONS

Office Action for U.S. Appl. No. 11/309,958, Sep. 13, 2010.
Office Action for U.S. Appl. No. 11/305,997, Jul. 28, 2010.
Office Action for U.S. Appl. No. 11/305,916, Sep. 23, 2010.
Office Action for U.S. Appl. No. 11/305,916, Nov. 3, 2010.
Office Action for U.S. Appl. No. 11/305,998, Sep. 13, 2010.
Hartman, J. et al., "The Zebra Striped Network File System," *ACM Transactions on Computer Systems (TOCS)*, vol. 13, Issue 3, Aug. 1995.
Musumeci, G. et al., System Performance Tuning, retrieved on Jul. 21, 2010, Retrieved from the Internet <URL: http://proquest.safaribooksonline.com/0-596-00284-X> Chapter 6, Feb. 2002.
Agrawal, S et al, "Integrating Vertical and Horizontal Partitioning into Automated Physical Database Design," *SIGMOD* 2004, Jun. 13-18, 2004, Paris, France.
Baykan, E., "Recent Research on Database System Performance," Jun. 28, 2005, published on Internet at www.CSd.uoc.grJ-hy460/0506_fall/instruetionaLmaterial,htr.
Bernardino, J. et al., "Experimental evaluation of a new distributed partitioning technique for data warehouses", *U Database Engineering & Applications*, 2001 International Symposium on. [online], Jul. 2001 [retrieved on Jan. 13, 2010]. Retrieved from Internet:<URL: http://ieeexplore.ieee.org/stamp/stamp.jsp?arnumber=00938099&tag=1 > pp. 312-321.
Bernardino, J. R. et al. "Approximate Query Answering Using Data Warehouse Striping," *Journal of Intelligent Information V Systems* [online], Sep. 2002 [retrieved on Jan. 13, 2010]. Retrieved from Internet:<URL: http://www.springerlink.com/contenUm216155r6xOh2751 /fu litext.pdf> pp. 145-167.

Copeland, G. et al. "A Decomposition Storage Model," *ACM SIGMOO International Conference on Management of Data*, pp. 268-279. ACM Press. 1985.
Dr. Math, "Ask Dr. Math Subject: Multiplying beyond Floating point calculations" Drexel University Aug. 9, 2003.
Hoffer et al. "Modern Database Management", Apr. 2004, Prentice Hall, 7th edition, 43 selected pages.
Rankins et al., "Microsoft SQl Server 2000 Unleashed", Dec. 12, 2001, *Sams*, 2 Pages.
Roth et al, "Database Compression," *SIGMOD Record*, 22:3, Sep. 1993 p. 31-39.
Zhou, J. et al., "A Multi-resolution Block Storage Model for Database Design, Ideas," p. 22, Seventh International Database Engineering and Applications Symposium, 2003.
Office Action for U.S. Appl. No. 11/305,916, Jan. 28, 2008.
Office Action for U.S. Appl. No. 11/305,916, Jul. 11, 2008.
Office Action for U.S. Appl. No. 11/305,916, Nov. 28, 2008.
Office Action for U.S. Appl. No. 11/305,916, Mar. 3, 2009.
Office Action for U.S. Appl. No. 11/305,916, Jun. 29, 2009.
Office Action for U.S. Appl. No. 11/305,916, Nov. 23, 2009.
Office Action for U.S. Appl. No. 11/305,916, Mar. 10, 2010.
Office Action for U.S. Appl. No. 11/305,916, May 28, 2010.
Office Action for U.S. Appl. No. 11/305,963 (US 7,587,569), Jan. 6, 2009.
Office Action for U.S. Appl. No. 11/305,963 (US 7,587,569), Sep. 4, 2008.
Office Action for U.S. Appl. No. 11/311,510 (US 7546321), Sep. 17, 2008.
Office Action for U.S. Appl. No. 11/311,510 (US 7546321), Apr. 30, 2008.
Office Action for U.S. Appl. No. 11/266,606 (US 7447839), Nov. 1, 2007.
Office Action for U.S. Appl. No. 11/266,667 (US 7457935), Dec. 11, 2007.
Office Action for U.S. Appl. No. 11/266,667 (US 7457935), Jul. 31, 2007.
Office Action for U.S. Appl. No. 11/266,668 (US 7447865), Feb. 20, 2008.
Office Action for U.S. Appl. No. 11/266,668 (US 7447865), Oct. 1, 2007.
Office Action for U.S. Appl. No. 11/305,998, Jul. 12, 2010.
Office Action for U.S. Appl. No. 11/305,998, Jan. 22, 2010.
Office Action for U.S. Appl. No. 11/305,998, Aug. 17, 2009.
Office Action for U.S. Appl. No. 11/305,998, Apr. 15, 2009.
Office Action for U.S. Appl. No. 11/305,998, Dec. 24, 2008.
Office Action for U.S. Appl. No. 11/305,998, Jul. 3, 2008.
Office Action for U.S. Appl. No. 11/305,998, Jan. 9, 2008.
Office Action for U.S. Appl. No. 11/305,997, Feb. 17, 2010.
Office Action for U.S. Appl. No. 11/305,997, Aug. 3, 2009.
Office Action for U.S. Appl. No. 11/305,997, Mar. 25, 2009.
Office Action for U.S. Appl. No. 11/305,997, Oct. 16, 2008.
Office Action for U.S. Appl. No. 11/305,997, May 12, 2008.
Office Action for U.S. Appl. No. 11/305,997, Dec. 31, 2007.
Office Action for U.S. Appl. No. 11/305,915, Feb. 19, 2010.
Office Action for U.S. Appl. No. 11/305,915, Aug. 12, 2009.
Office Action for U.S. Appl. No. 11/305,915, Mar. 31, 2009.
Office Action for U.S. Appl. No. 11/305,915, Oct. 16, 2008.
Office Action for U.S. Appl. No. 11/305,915, May 8, 2008.
Office Action for U.S. Appl. No. 11/305,915, Dec. 31, 2007.
Office Action for U.S. Appl. No. 11/305,958, Jul. 8, 2010.
Office Action for U.S. Appl. No. 11/305,958, Jan. 22, 2010.
Office Action for U.S. Appl. No. 11/305,958, Aug. 17, 2009.
Office Action for U.S. Appl. No. 11/305,958, Apr. 15, 2009.
Office Action for U.S. Appl. No. 11/305,958, Dec. 31, 2008.
Office Action for U.S. Appl. No. 11/305,958, Jul. 17, 2008.
Office Action for U.S. Appl. No. 11/305,958, Jan. 8, 2008.

* cited by examiner

HIERARCHY OF SERVERS FOR QUERY PROCESSING OF COLUMN CHUNKS IN A DISTRIBUTED COLUMN CHUNK DATA STORE

CROSS-REFERENCE TO RELATED APPLICATIONS

This application is a continuation of U.S. patent application Ser. No. 11/311,825, filed on Dec. 19, 2005 now U.S. Pat. No. 7,860,865, entitled "System of a Hierarchy of Servers for Query Processing of Column Chunks in a Distributed Column Chunk Data Store", by Radha Krishna Uppala.

FIELD OF THE INVENTION

The invention relates generally to computer systems, and more particularly to an improved system and method for query processing in a distributed column chunk data store.

BACKGROUND OF THE INVENTION

Distributed storage systems implemented either as a distributed database or a distributed file system fail to scale well for data mining and business intelligence applications that may require fast and efficient retrieval and processing of large volumes of data. Distributed databases for large volumes of data, perhaps on the order of terabytes, may be traditionally implemented across several servers, each designed to host a portion of a database and typically storing a particular table data. In some implementations, such a system may also store a horizontally partitioned table of data on one or more servers. For instance, the technique known as horizontal partitioning may be used to store a subset of rows of data in a table resident on a storage server. Queries for retrieving data from the distributed storage system may then be processed by retrieving rows of data having many associated columns of datum for which only one or few columns may be needed to process the query. As a result, the storage and retrieval of data in these types of systems is inefficient, and consequently such systems do not scale well for handling terabytes of data.

Typical transaction processing systems using a distributed database likewise fail to scale well for data mining and business intelligence applications. Such systems may characteristically have slower processing speed during a failed transaction. During transaction processing a failed transaction may become abandoned and the database may be rolled back to a state prior to the failed transaction. Such database implementations prove inefficient for updating large data sets on the order of gigabytes or terabytes.

Distributed file systems are also inadequate for storage and retrieval of data for data mining and business intelligence applications. First of all, distributed file systems may only provide low-level storage primitives for reading and writing data to a file. In general, such systems fail to establish any semantic relationships between data and files stored in the file system. Unsurprisingly, semantic operations for data storage and retrieval such as redistributing data, replacing storage, and dynamically adding additional storage are not available for such distributed file systems.

What is needed is a way for providing data storage, query processing and retrieval for large volumes of data perhaps in the order of hundreds of terabytes for data warehousing, data mining and business intelligence applications. Any such system and method should allow the use of common storage components without requiring expensive fault-tolerant equipment.

SUMMARY OF THE INVENTION

Briefly, the present invention may provide a system and method for query processing in a distributed column chunk data store. A distributed column chunk data store may be provided by multiple storage servers operably coupled to a network. A client executing an application may also be operably coupled to the network. A storage server provided may include a database engine for partitioning a data table into column chunks for distributing across multiple storage servers, a storage shared memory for storing the column chunks during processing of semantic operations performed on the column chunks, and a storage services manager for striping column chunks of a partitioned data table across multiple storage servers.

The database engine may include a loading services module for importing data into a data table partitioned into column chunks, a query services module for receiving requests for processing data stored as column chunks striped across multiple storage servers, a metadata services module for managing metadata about the column chunks striped across the plurality of storage servers, a transaction services module for maintaining the integrity of the information about semantic operations performed on the column chunks, and a storage services proxy module for receiving storage services requests and sending the requests for execution by the storage services manager. The storage services manager may include compression services for compressing the column chunks before storing to the column chunk data store and transport services for sending one or more compressed or uncompressed column chunks to another storage server.

Advantageously, a data table may be flexibly partitioned into column chunks using one or more columns as a key with various partitioning methods, including range partitioning, list partitioning, hash partitioning, and/or combinations of these partitioning methods. There may also be a storage policy for specifying how to partition a data table for distributing column chunks across multiple servers, including the number of column chunks to create. The storage policy may also specify the desired level of redundancy of column chunks for recovery from failure of one or more storage servers storing the column chunks. The storage policy may also specify how to assign column chunks to available storage servers. There may be a storage policy for each data table that may be different from the storage policy for another data table and may specify a different method for partitioning the data table into column chunks, a different level of redundancy for recovery from failure of one or more servers, and/or a different method for distributing the column chunks among the multiple storage servers.

The invention may also support query processing for data stored in the distributed column chunk data store. In an embodiment, query processing may be performed by storage servers in the column chunk data store. In another embodiment, query processing may be performed by query processing servers operably coupled by a network to storage servers in the column chunk data store. A query processing server provided may include a query services module having an operably coupled query parser for validating the syntax of a query, an operably coupled query analyzer for validating the semantic content of the query, an operably coupled query optimizer for optimizing execution steps of a query for distributed processing, and a query executor for executing processing steps of a query.

In various embodiments, a storage server and/or a query processing server that may receive a request to process a query about data stored in the column chunk data store may dynamically determine a hierarchy of servers to process execution steps of the query that may be transformed for distributed processing. In this way, multiple servers may process the transformed query and combine intermediate results obtained from distributed processing of execution steps for the transformed query. Once the query may be resolved, results may be returned to the requester.

Other advantages will become apparent from the following detailed description when taken in conjunction with the drawings, in which:

DETAILED DESCRIPTION EXEMPLARY EMBODIMENTS

Operating Environment

Figure 1:
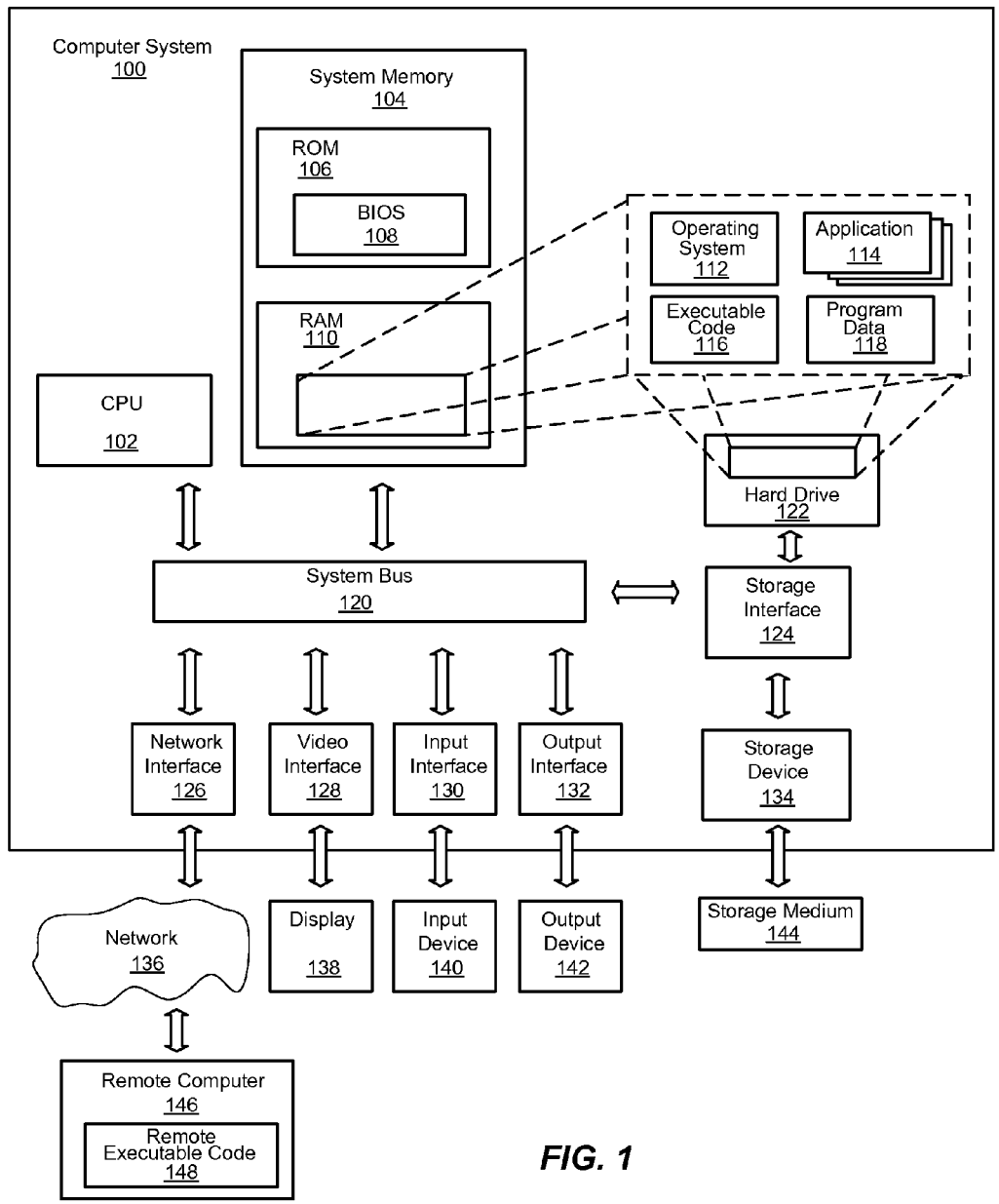
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may also embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used.

Query Processing in a Distributed Column Chunk Data Store

The present invention is generally directed towards a system and method for query processing in a distributed column chunk data store. More particularly, the present invention provides multiple storage servers operably coupled by a network for storing distributed column chunks of partitioned data tables. Any data table may be partitioned into column chunks and the column chunks may then be distributed for storage among multiple storage servers. To do so, a data table may be flexibly partitioned into column chunks by applying various partitioning methods using one or more columns as a key, including range partitioning, list partitioning, hash partitioning, and/or combinations of these partitioning methods. Subsequently, a request may be received to process a query about data stored in the column chunk data store. A hierarchy of servers may then be dynamically determined to process execution steps of the query that may be transformed for distributed processing. As a result, multiple servers may process the transformed query in parallel and combine intermediate results obtained from distributed processing of execution steps for the transformed query. Once the query may be resolved, results may be returned to the requester.

As will be seen, query processing may be performed in one embodiment by storage servers in the column chunk data store. In another embodiment, query processing may be performed by query processing servers connected by a network to storage servers in the column chunk data store. As will be understood, the various block diagrams, flow charts and scenarios described herein are only examples, and there are many other scenarios to which the present invention will apply.

Figure 2:
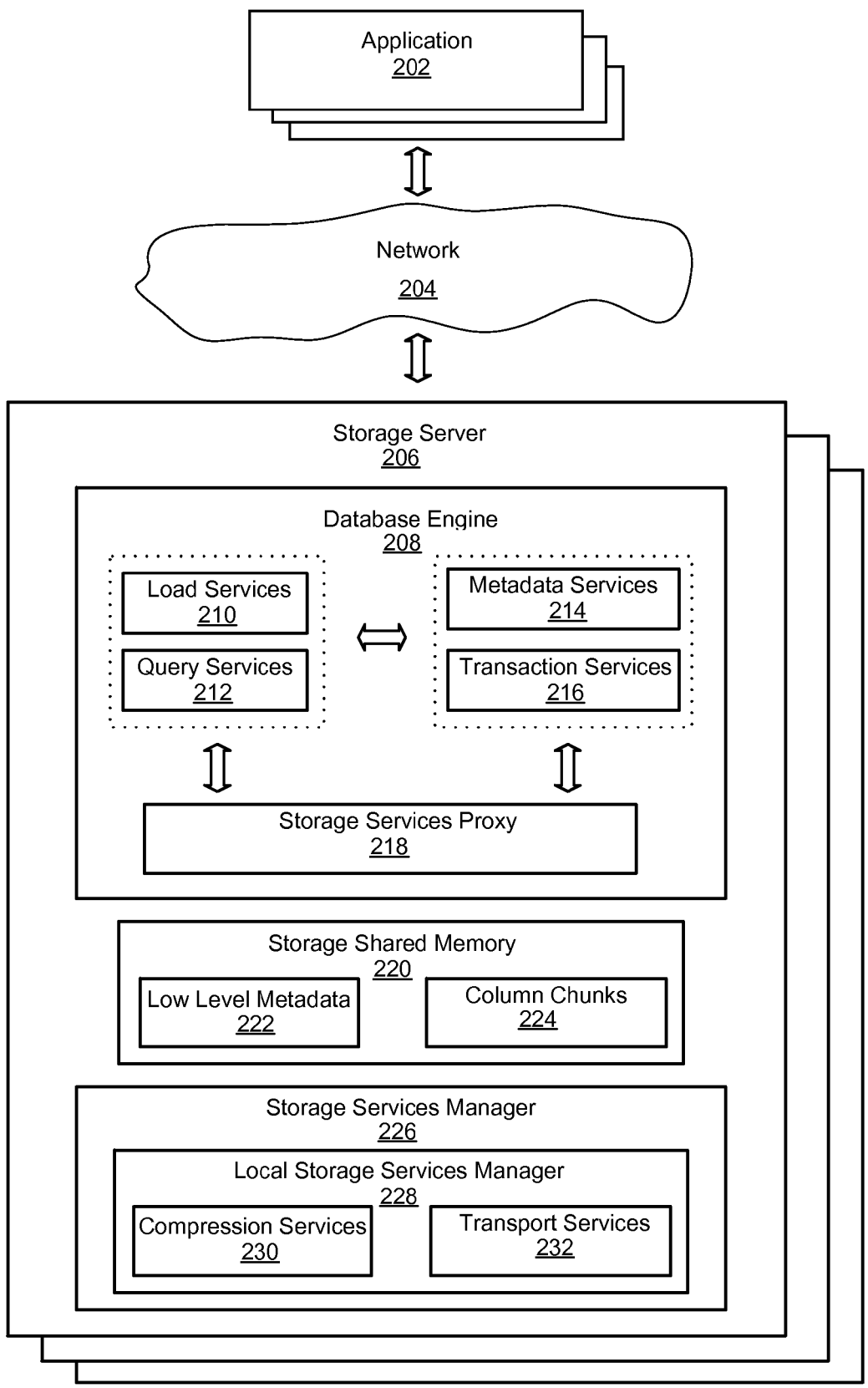
FIG. 2 is a block diagram generally representing an exemplary architecture of system components for a column chunk data store, in accordance with an aspect of the present invention.

Turning to FIG. 2 of the drawings, there is shown a block diagram generally representing an exemplary architecture of system components for a distributed column chunk data store. Those skilled in the art will appreciate that the functionality implemented within the blocks illustrated in the diagram may be implemented as separate components or the functionality of several or all of the blocks may be implemented within a single component. For example, the functionality for the storage services manager 226 may be included in the same component as the database engine 208. Or the functionality of transport services 232 may be implemented as a separate component.

As used herein, a column chunk data store may mean a large distributed system of operably coupled storage servers, each capable of storing column chunks. In various embodiments, one or more applications 202 may be operably coupled to one or more storage servers 206 by a network 204. The network 204 may be any type of network such as a local area network (LAN), a wide area network (WAN), or other type of network. In general, an application 202 may be any type of executable software code such as a kernel component, an application program, a linked library, an object with methods, and so forth. In one embodiment, an application may execute on a client computer or computing device, such as computer system environment 100 of FIG. 1 which may be operably coupled to one or more storage servers 206 by the network 204. An application 202 may include functionality for querying the column chunk data store to retrieve information for performing various data mining or business intelligence operations, such as computing segment membership, performing some aggregation of data including summarization, and so forth.

A storage server 206 may be any type of computer system or computing device such as computer system environment 100 of FIG. 1. The storage server may provide services for performing semantic operations on column chunks such as redistributing data, replacing storage, and/or adding storage and may use lower-level file system services in carrying out these semantic operations. A storage server 206 may include a database engine 208 storage shared memory 222, and a storage services manager 226. Each of these modules may also be any type of executable software code such as a kernel component, an application program, a linked library, an object with methods, or other type of executable software code.

The database engine 208 may be responsible, in general, for communicating with an application 202, communicating with the storage server to satisfy client requests, accessing the column chunk data store, and communicating with the storage services manager 226 for execution of storage operations, including accessing column chunks 224 in storage shared memory 220. The database engine 208 may include load services 210, query services 212, metadata services 214, transaction services 216 and a storage services proxy 218. Load services 210 may be used for importing data into the data tables. Query services 212 may process received queries by retrieving the data from the storage services manager 226 and processing the retrieved data. The load services 210 and query services 212 may communicate with the metadata services 214 and transaction services 216 using a communication mechanism such as inter-process communication. Each of these services may in turn communicate with the storage services proxy 218 to request services such as retrieving and loading column chunks into storage shared memory 220. The storage services proxy 218 may receive storage read and write requests and pass the requests off to the storage services manager 226 to execute the request.

The metadata services 214 may provide services for the configuration of the storage servers and may manage metadata for the database engine and the column chunk data store. The metadata may include, for example, data tables that reflect the current state of the system including the name of each server configured in the system, the load on each server, the bandwidth between servers, and many other variables maintained in the data tables. There may be dynamically updated tables and static tables of data. Static tables of data may include configuration tables, the defined logical tables, policies that may apply for partitioning the data table and storage distribution, and so forth. Some tables, such as configuration tables, may be generated dynamically by the system based upon system configuration. The metadata services 214 may include services to dynamically update metadata, such as configuration tables. In addition, metadata services 214 may include services to add or update fixed metadata such as adding new logical data table definitions or updating an existing logical data table definition.

The transaction services 216 may be responsible for maintaining active transactions in the system and may provide various services such as identifying and loading the appropriate version of column chunks. The transaction services 216 can also notify metadata services to update or commit metadata relating to a specific transaction. Generally, a transaction may include semantic operations that modify the system or that may be performed on data, including data loading, data optimization, data retrieval, updating existing data table, creating new tables, modifying the data schema, creating a new storage policy, partitioning data tables, recording the column chunk distribution in storage servers, and so forth. For each transaction such as incrementally updating a data table, there may be an indication of a start of a transaction and end of transaction when the update of the data table completes. Other examples of transactions may be executing a query, including generating intermediate data tables or other data tables, or optimizing storage of column chunks. To do so, the query services may use transaction services to process a query and the storage services manager may use transactions services while optimizing column chunk storage.

The storage shared memory 220 of the storage server 206 may include low level metadata 222 and column chunks 224. The low level metadata may include information about physical storage, such as the file name and server name where a column chunk may be located, what the compressed size of a column chunk may be, what the uncompressed size of a column chunk may be, what the checksum on a column chunk may be for verifying that the column chunk is not corrupted on the disk storage, and so forth. The storage services manager 226 may generate low level metadata 222 by using the metadata such as policies, server configurations, resources available in metadata to generate physical storage for column chunks.

The storage services manager 226 may include a local storage services manager 228 that may provide compression services 230 and transport services 232. The compression services 230 may perform data domain compression and decompression of column chunks. For instance, data domain compression may be performed before storing the column chunks in storage and data domain decompression may be performed upon retrieving the column chunks from storage. Transports services 232 may provide services to transfer column chunks between servers. In one embodiment, a low level protocol may be employed upon a TCP/IP protocol stack for sending and receiving column chunks.

Figure 3:
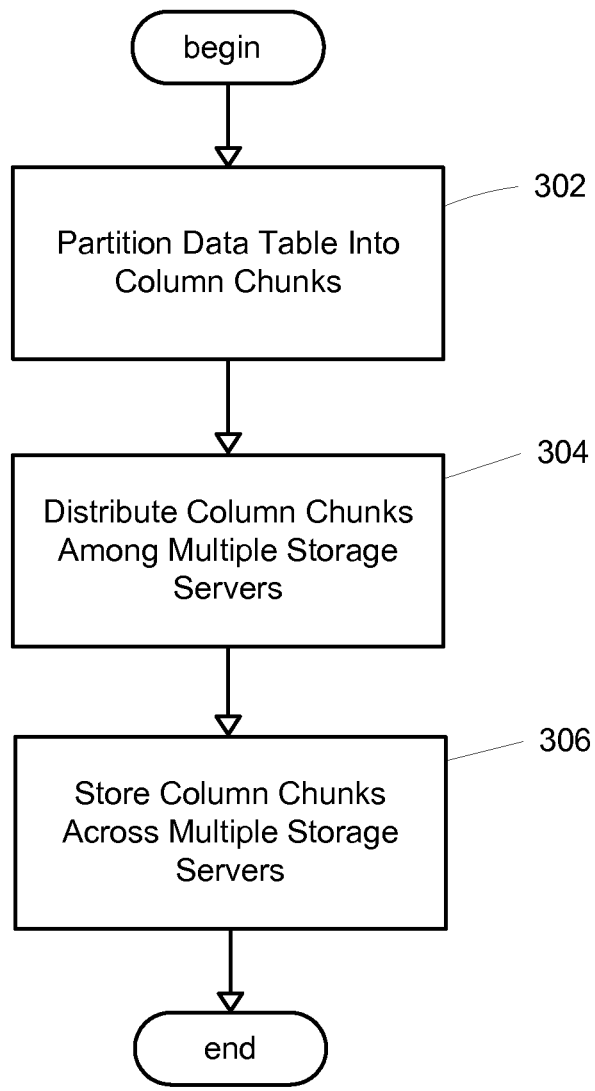
FIG. 3 is a flowchart generally representing the steps undertaken in one embodiment for storing column chunks among multiple storage servers in the column chunk data store, in accordance with an aspect of the present invention.

There are many applications which may use the present invention for storing large volumes of detailed data over long periods of time. Data mining, segmentation and business intelligence applications are examples among these many applications. FIG. 3 presents a flowchart generally representing the steps undertaken in one embodiment for storing column chunks among multiple storage servers in the column chunk data store. At step 302, a data table may be partitioned into column chunks. As used herein, a column chunk may mean a column of a data table partitioned using one or more columns as a key. Any type of data table may be partitioned into column chunks. For instance, a large fact table capturing transactions of users logging into a website may be partitioned into column chunks. In one embodiment, the data table may be partitioned into column chunks by performing column-wise partitioning whereby a partition may be specified by a set of columns. In another embodiment, a combination of some data table partitioning technique and column-wise partitioning may be performed. In this embodiment, the data table may be first partitioned into several data tables and then column-wise partitioning may be performed on the resulting data tables to create column chunks. To do so, those skilled in the art will appreciate that a data table may be partitioned into column chunks using any number of partitioning techniques such as range partitioning by specifying a range of value for a partitioning key, list partitioning by specifying a list of values for a partitioning key, hash partitioning by applying hashing to a partitioning key, combinations of these partitioning techniques, and other partitioning techniques known to those skilled in the art.

Once the data table may be partitioned into column chunks, the storage server may distribute the column chunks among multiple storage servers at step 304. For example, the column chunks of the data table may be striped across multiple storage servers. In one embodiment, each column chunk of the data table may be assigned to an available storage server using any assignment method including round robin order. In various embodiments, column chunks of a data table may be striped across multiple storage servers. As used herein, column chunk striping means striping column chunks of a data table across multiple storage servers. Any level of redundancy may be implemented in distributing the column chunks for recovery of one or more failed servers. For example, column chunk parity may be calculated and stored to enable recovery from failure of one server. In an embodiment, a bitwise XOR operation may be performed on two column chunks to create a parity column chunk. Additional bitwise XOR operations may be performed with a parity column chunk and another binary representation of a column chunk to compute a parity column chunk for three column chunks. The resulting parity column chunk may then be assigned to an available server that does not store one of the three column chunks used to make the parity column chunk. In this way, any number of parity column chunks may be calculated and assigned to storage servers for recovery from failure of one or more storage servers. It should be noted that prior to performing a bitwise XOR operation on two column chunks of unequal length, the shorter column chunk may be padded with 0's until it become of equal length with the other column chunk.

Once the distribution of column chunks among the multiple storage servers may be determined, the column chunks may be stored on their assigned servers at step 306. After the column chunks have been stored, processing may be finished for storing column chunks among multiple storage servers in the column chunk data store.

Figure 4:
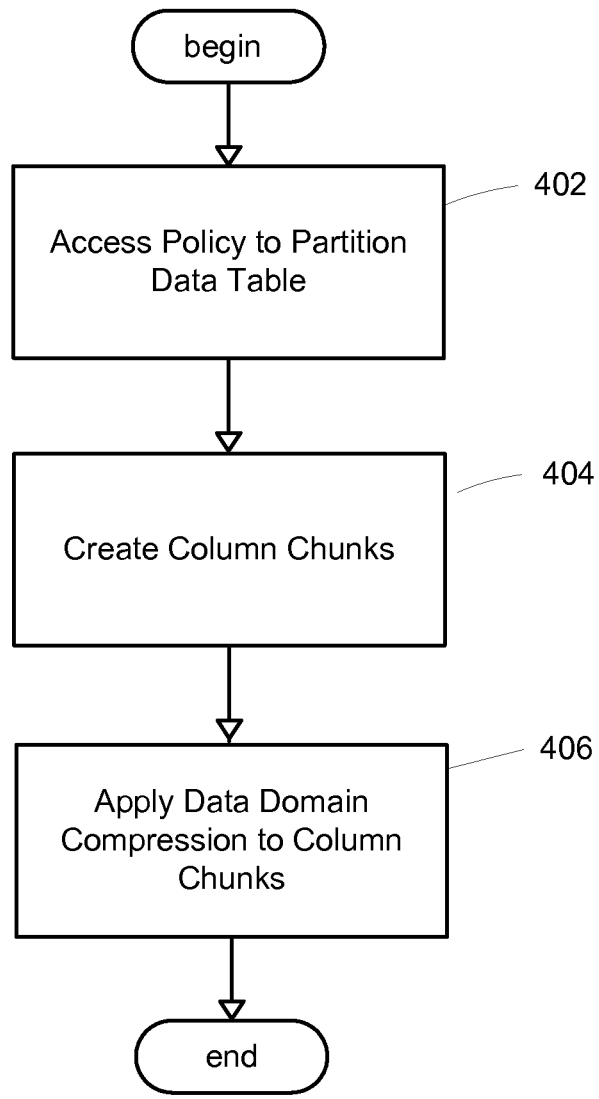
FIG. 4 is a flowchart generally representing the steps undertaken in one embodiment for partitioning a data table into column chunks, in accordance with an aspect of the present invention.

FIG. 4 presents a flowchart generally representing the steps undertaken in one embodiment for partitioning a data table into column chunks. At step 402, a policy for partitioning the data table into column chunks may be accessed. For example, there may be a policy stored as part of the metadata that may specify how the data table may be partitioned into column chunks and how the column chunks may be distributed among multiple storage servers in the column chunk data store. In one embodiment, the policy may specify the number of partitions into which a column should be divided. In various embodiments, the policy may specify the degree of redundancy of the column chunks for recovery upon failure of one or more storage servers.

Any policy for partitioning the data table may then be applied at step 404 to create the column chunks. In an embodiment, partitioning may be performed on the data table by first partitioning the data table into multiple tables using range partitioning and then partitioning each of the multiple tables by applying column-wise partitioning. In various other embodiments, list partitioning, hash partitioning, or combinations of list, hash, and/or range partitioning may be applied to partition the data table into multiple tables and then column wise partitioning may be subsequently applied to each of the multiple data tables.

Once the column chunks may be created, then data domain compression may be applied to the column chunks at step 406. Data domain compression as used herein may mean applying a compression scheme designed to compress a specific data type. Given that values in a column of a column chunk may usually be the same data type and/or part of a specific data domain, partitioning a data table into column chunks may advantageously allow data in the column chunks to be compressed using a specific domain type compression scheme. For example, if a column of a column chunk may store a date that falls within a narrow range, such as between Jan. 1, 2000 and Dec. 31, 2010, the date field may be represented using the number of days since Jan. 1, 2000 rather than using a generic date representation. As another example, consider an address that may typically be stored as a string that may not compress well. By decomposing the address field into several subfields, such as street number, street name, city, state, and zip, each subfield may be represented as a separate sub-column having a specific data type that may compress well. As yet another example, consider an argument list of key-value pairs that may also be typically stored as a string that may not compress well. By decomposing the key-value pairs into separate column chunks, each column chunk may represent values having a specific data type that may compress well. Such compression may be performed using range-based compression of numeric values, decomposing a column chunk including sub-fields into separate column chunks, decomposing a column chunk including key-value pairs into separate column chunks, and so forth. After domain specific compression may be applied to the column chunks, processing for partitioning a data table into column chunks may be finished.

Figure 5A:
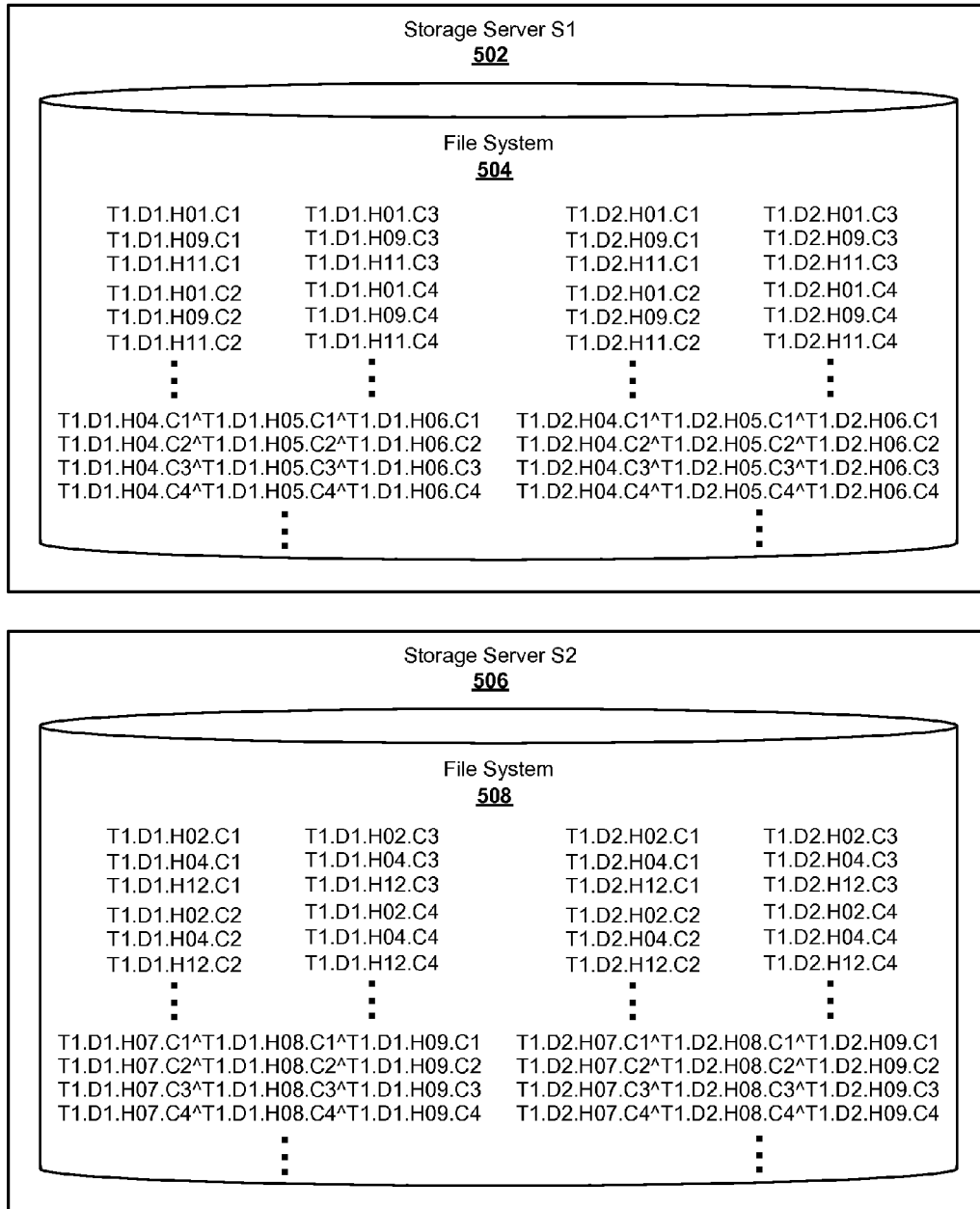
FIGS. 5A and 5B are exemplary illustrations generally depicting logical representations of column chunks of a partitioned data table striped across multiple storage servers with parity for recovering from failure of a server, in accordance with an aspect of the present invention.
Figure 5B:
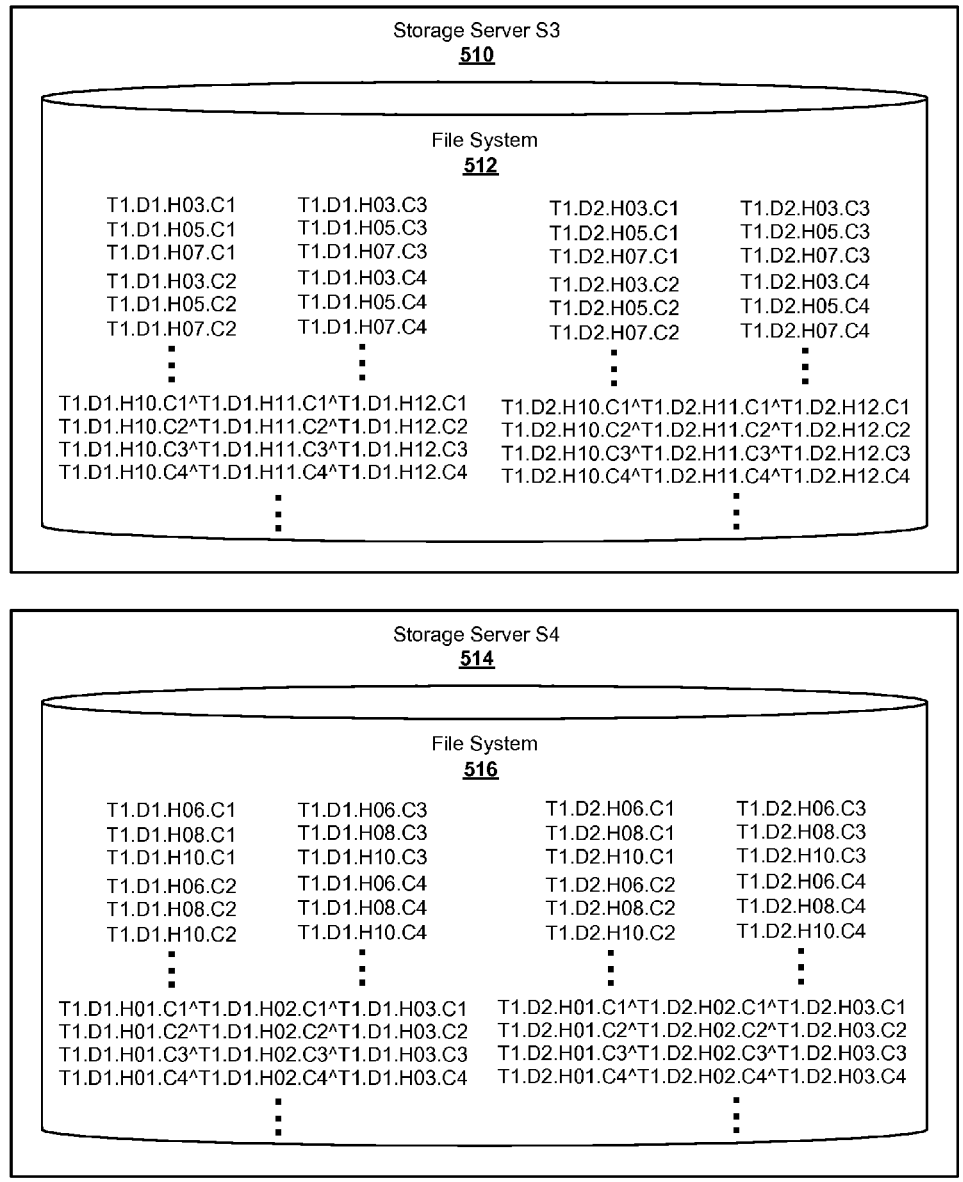

FIGS. 5A and 5B present exemplary illustrations generally depicting logical representations of column chunks of a partitioned data table striped across multiple storage servers with parity for recovering from failure of a server. There may be any number of storage servers, such as storage servers S1 502 and S2 506 illustrated in FIG. 5A, and S3 510 and S4 514 illustrated in FIG. 5B. A data table T1 may be first partitioned by date to create two data table such as T1.D1 and T1.D2, and then hashing may be applied to each of these data table to create column chunks. The storage policy may specify a redundancy level for recovery from failure of a server. There may also be a distribution policy such as column chunk striping specified in the storage policy. FIGS. 5A and 5B illustrate an embodiment of column chunk striping with redundancy across multiple servers in round robin order. For instance, hashing may produce 12 hashes, which may be represented as H01 through H12. Considering that data table T1.D1 may have four columns, C1 through C4, there may be 48 column chunks created with four column chunks in each hash bucket, which may be represented as T1.D1.H01.C1, T1.D1.H01.C2, T1.D1.H01.C3, T1.D1.H01.C4, T1.D1.H02.C1 . . . T1.D1.H12.C4 as illustrated in FIGS. 5A and 5B. Additionally, parity may be calculated by performing a bitwise XOR operation for combinations of column chunks such as T1.D1.H04.C1^T1.D1.H05.C1^T1.D1.H06.C1, T1.D1.H04.C2^T1.D1.H05.C2^T1.D1.H06.C2, T1.D1.H04.C3^T1.D1.H05.C3^T1.D1.H06.C3, and T1.D1.H04.C4^T1.D1.H05.C4^T1.D1.H06.C4.

Column chunks, T1.D1.H01.C1 through T1.D1.H01.C4, may be assigned to the first storage server, S1 502, and stored in file system 504. Additionally, parity of column chunks, T1.D1.H04.C1^T1.D1.H05.C1^T1.D1.H06.C1 through T1.D1.H04.C4^T1.D1.H05.C4^T1.D1.H06.C4, may also be assigned to the first storage server, S1 502, and stored in file system 504. Column chunks, T1.D1.H02.C1 through T1.D1.H02.C4 and T1.D1.H04.C1 through T1.D1.H04.C4, may be assigned to the second storage server, S2 506, and stored in file system 508. Additionally, parity of column chunks, T1.D1.H07.C1^T1.D1.H08.C1^T1.D1.H09.C1 through T1.D1.H07.C4^T1.D1.H08.C4^T1.D1.H09.C4, may also be assigned to the second storage server, S2 506, and stored in file system 508. Column chunks, T1.D1.H03.C1 through T1.D1.H03.C4 and T1.D1.H05.C1 through T1.D1.H05.C4, may be assigned to the third storage server, S3 510, and stored in file system 512. Additionally, parity of column chunks, T1.D1.H10.C1^T1.D1.H11.C1^T1.D1.H12.C1 through T1.D1.H10.C4^T1.D1.H11.C4^T1.D1.H12.C4, may also be assigned to the third storage server, S3 510, and stored in file system 512. Column chunks, T1.D1.H06.C1 through T1.D1.H06.C4, may be assigned to the fourth storage server, S4 514, and stored in file system 516. Additionally, parity of column chunks, T1.D1.H01.C1^T1.D1.H02.C1^T1.D1.H03.C1 through T1.D1.H01.C4^T1.D1.H02.C4^T1.D1.H03.C4, may also be assigned to the fourth storage server, S4 514, and stored in file system 516.

Then column chunks T1.D1.H07.C1 through T1.D1.H07.C4 may be assigned to the third storage server, S3 510, and stored in file system 512. Next, column chunks T1.D1.H08.C1 through T1.D1.H08.C4 and T1.D1.H10.C1 through T1.D1.H10.C4 may be assigned to the fourth storage server, S4 514, and stored in file system 516. Column chunks T1.D1.H09.C1 through T1.D1.H09.C4 and T1.D1.H11.C1 through T1.D1.H11.C4 may be assigned to the first storage server, S1 502, and stored in file system 504. Finally, column chunks T1.D1.H12.C1 through T1.D1.H12.C4 may be assigned to the second storage server, S2 506, and stored in file system 508.

Similarly, there may be 48 column chunks created for data table T1.D2 with four column chunks in each of 12 hash buckets, which may be represented as T1.D2.H01.C1, T1.D2.H01.C2, T1.D2.H01.C3, T1.D2.H01.C4, T1.D2.H02.C1 . . . T1.D2.H12.C4. These 48 column chunks may likewise be distributed across multiple servers using column chunk striping with redundancy in round robin order as illustrated in FIGS. 5A and 5B.

Figure 6:
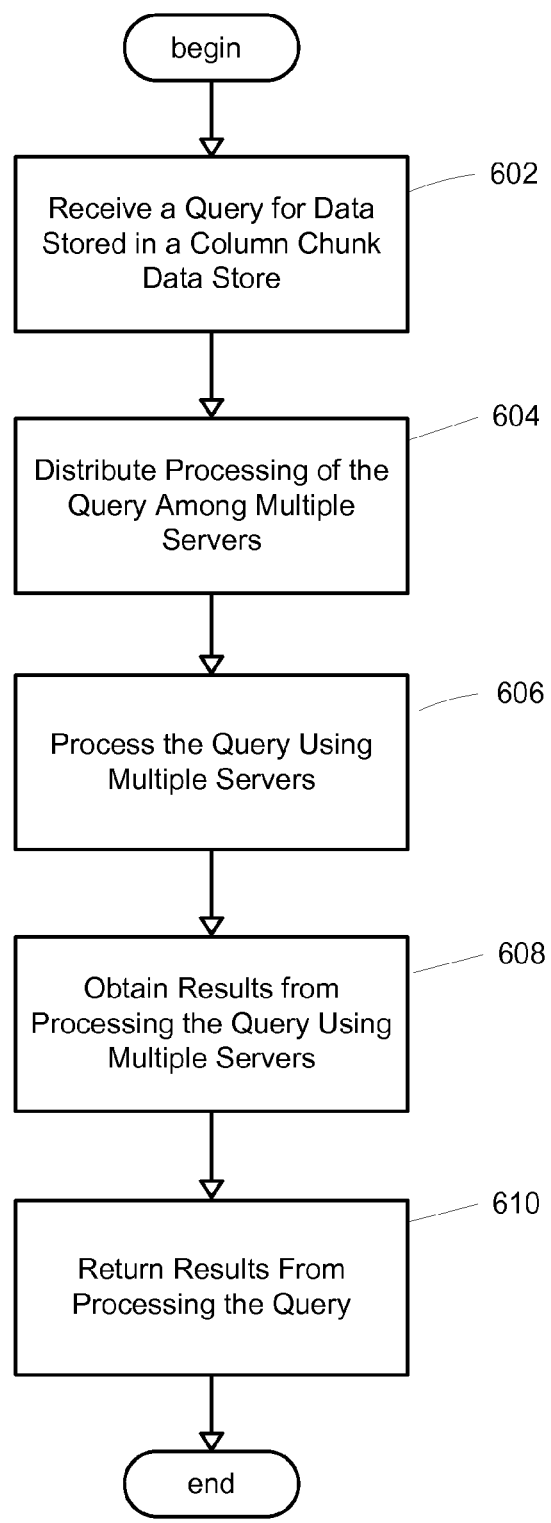
FIG. 6 is a flowchart generally representing the steps undertaken in one embodiment for processing a query about data stored in the column chunk data store, in accordance with an aspect of the present invention.

After the data tables may be partitioned, distributed and stored in the column chunk data store, a client or application program may send a query about data stored in the column chunk data store. FIG. 6 presents a flowchart generally representing the steps undertaken in one embodiment for processing a query about data stored in the column chunk data store. At step 602, a request to process a query about data stored in the column chunk data store may be received. For example, a client or application may send a request to process a query such as an SQL query as follows:

```
Select C1, C2
From T1, T2
Where T1.C1 = T2.C1
And T1.C3 = T2.C2.
```

At step 604, processing of a query referencing data in the column chunk data store may be distributed among multiple servers. In one embodiment, query processing may be performed by storage servers in the column chunk data store. In another embodiment, query processing may be performed by query processing servers operably coupled by a network to storage servers in the column chunk data store. In various embodiments, a storage server and/or a query processing server that may receive a request to process a query about data stored in the column chunk data store may dynamically determine a hierarchy of servers to process execution steps of the query that may be transformed for distributed processing. As used herein, a transformed query means one or more queries that may each include a subset of execution steps for performing distributed query processing of the original query. The SQL query above, for instance, may be analyzed and transformed in various embodiments to provide instructions for directing distributed processing of the query among a group of storage servers and/or query processing servers.

At step 606, the query may be processed by the multiple servers and results may be obtained at step 608 from processing the query using multiple servers. In an embodiment, a storage server and/or query processing server, which may have received a request to process a query about data stored in the column chunk data store and which may have transformed the query for distributed processing by multiple servers, may combine the results obtained from execution steps performed for the transformed query to resolve the query request. At step 610 the results from processing the query may be returned to the requester. After the results may be returned to the requester, processing may be finished for processing a query about data stored in the column chunk data store.

Figure 7:
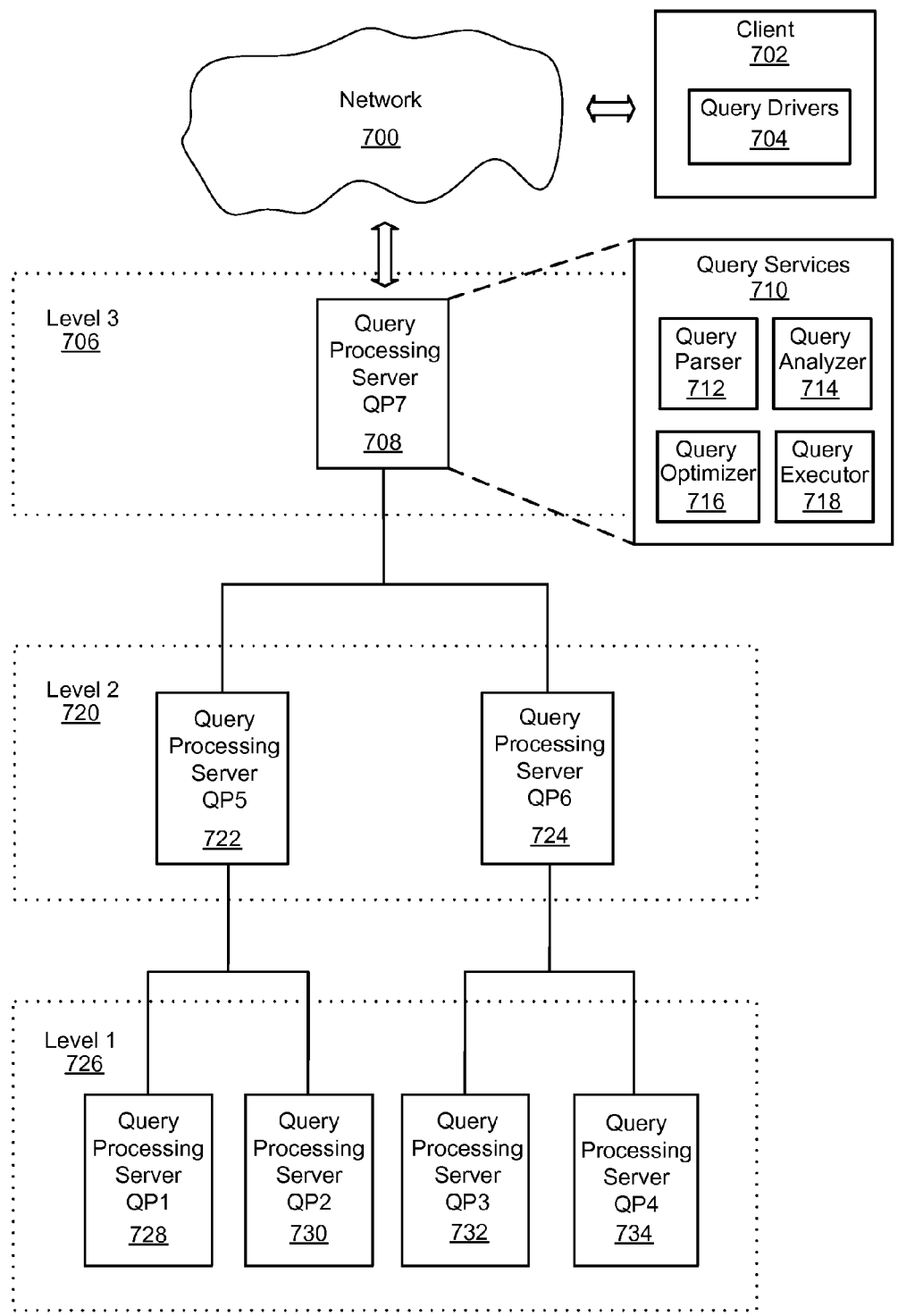
FIG. 7 is a block diagram illustrating an exemplary configuration of system components in an embodiment for performing distributed query processing in the column chunk data store, in accordance with an aspect of the present invention.

FIG. 7 presents a block diagram illustrating an exemplary configuration of system components in an embodiment for performing distributed query processing in the column chunk data store. In general, the exemplary configuration of FIG. 7 illustrates an embodiment of query processing servers dynamically configured in a hierarchy for performing execution steps of a query transformed for distributed processing. A client 702 including a query driver 704 may be operably coupled by a network 700, like network 204 illustrated in FIG. 2, to one of more query processing servers in a hierarchy of operably coupled query processing servers such as query processing servers QP1 728, QP2 730, QP3 732, QP4 734, QP5 722, QP6 724 and QP7 708. For instance, client 702 may be operably coupled to query processing server QP7 708 as illustrated in FIG. 7. Client 702 may be an application like application 202 illustrated in FIG. 2 that may submit a query request about data in the column chunk data store for processing. Client 702 may include one or more query drivers for sending a query request to a query processing server. The query driver may be any type of query driver such as a .net provider or an ODBC driver.

The hierarchy of query processing servers may conceptually include a third level 706 of one or more query processing servers, an second level 720 of one or more query processing servers, and a first level 726 of one or more query processing servers. The third-level query processing servers may serve as gateway servers that may interface with clients and may be operably coupled to second-level query processing servers. The second-level query processing servers may assist in processing queries transformed for distributed processing and may be operably coupled to first-level query processing servers that may process queries transformed for specific column chunks. Each of the query processing servers may include a query services module 710 for processing queries. In general, the query service module 710 may dynamically configure a hierarchy of query processing servers for performing execution steps of a query transformed for distributed processing and may provide instructions for distributed processing of the query.

The query services module 710 may include an operably coupled query parser 712, an operably coupled query analyzer 714, an operably coupled query optimizer 716, and a query executor 718. The query parser 712 may parse a received query and validate the syntax of the query. The query analyzer 714 may then validate the semantic content of the query by verifying, for example, that a table or a column of a table referenced by the query may exist in the column chunk data store or may be created from data in the column chunk data store. The query optimizer 716 may determine and optimize the execution steps of a query so that query execution may be distributed to use first-level query processing servers that may have cached a subset of column chunks referenced by the query. The query executor 718 may execute a query and/or a transformed query.

In another embodiment, a query processing server may also be a storage server as described and illustrated in FIG. 2. In various embodiments, a query processing server may include components of a storage server as described and illustrated in FIG. 2. For example, a query processing server may include a storage shared memory for storing the column chunks during processing of a query referencing the column chunks. A query processor may also include a storage services manager for retrieving one or more compressed or uncompressed column chunks from a storage server during query processing and for caching compressed or uncompressed column chunks in persistent storage. Those skilled in the art will appreciate that a query processing server may also include other components of a storage server in various other embodiments such as a storage services proxy module for receiving storage services requests and sending the requests for execution by the storage services manager.

Advantageously, the hierarchical model of the exemplary embodiment illustrated in FIG. 7 allows caching of column chunks for faster query processing and reduced input/output. If the column chunks needed to process a query are available in the cache of third-level query processing servers, the third-level query processing servers may process the query or may use second-level storage servers to process intermediate results generated from transformed queries processed by third-level query processing servers.

The third-level query processing servers may determine to distribute a query, transform a query, assign first-level query processing servers and any second-level processors to combine results and provide instructions for how to process the query and send the query and instructions to second-level storage processors. A second-level query processing server may determine whether the instructions indicate a first-level query processing server should process the transformed query, and, if so, sends the transformed query to the first-level query processing server. When the first-level query processing server may process the query, it may send results to a second-level query processing server to combine results of the execution steps performed by first-level query processing servers.

This processing configuration allows the query processing servers the flexibility to decide which query processing servers may most efficiently process a query and reduce transmission of column chunks. In various embodiments, second-level processing servers may or may not be used. In various other embodiments, first-level storage servers may or may not be used. If the column chunks are cached and the query may not be complex, second-level and/or first-level query processing servers may not be used.

Figure 8:
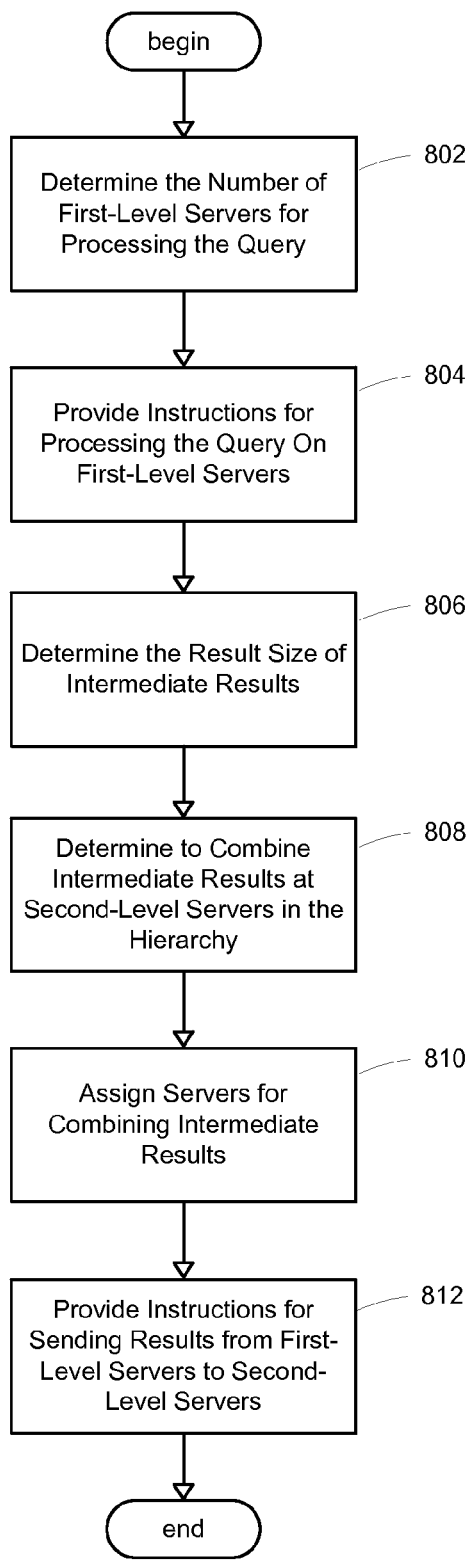
FIG. 8 is a flowchart generally representing the steps undertaken in one embodiment for distributing processing of a query referencing column chunks in the column chunk data store, in accordance with an aspect of the present invention.

FIG. 8 presents a flowchart generally representing the steps undertaken in one embodiment for distributing processing of a query referencing column chunks in the column chunk data store. A query, for instance, may be analyzed and transformed in an embodiment for processing by a hierarchy of servers. To do so, the number of first-level query processing servers that may be included in a hierarchy of query processing servers for processing instructions of a transformed query may be determined at step 802. In an embodiment, the location of cached column chunks referenced by the query may be considered for determining which query processing servers may be candidates as first-level query processing servers for execution of transformed queries. For instance, one or more query processing servers that may cache the column chunks referenced by the query may be initially selected for performing execution steps of the query that may involve column chunks cached on those respective query processing servers.

After the number of first-level query processing servers may be determined for processing the query, instructions may be provided at step 804 for processing the query on selected first-level query processing servers. For example, considering that columns of data table T1 may be partitioned into 12 column chunks by hashing and that data table T2 may be an unpartitioned table, the following SQL statements may be generated for transforming the SQL query above to direct another query processing server such as QP2 to assign query execution steps to other query processing servers:

PARALLEL ON {QP4, QP3, QP3, QP4}
WITH {1-3, 4-6, 7-9, 10-12}

-continued

BEGIN
SELECT C1, C2
INTO Q1_Hx_Hy
FROM T1, T2
WHERE T1.C1 = T2.C1
AND T1.C3 = T2.C2
AND T1._HASH ≥ x AND T1._HASH ≤ y.

Thus query processing server QP2 may be directed to send multiple transformed query requests to other query processing servers such as QP3 and QP4 for processing the query in parallel.

Next, the result size of intermediate results from processing the query in parallel may be determined at step 806. For example, the size of a result data table may be calculated for processing a transformed query for a subset of hash column chunks. More particularly, considering that columns of data table T1 may be partitioned into 12 column chunks by hashing, the size of a result data table may be calculated for processing a transformed query for hash column chunks 1-3. Similarly, the size of result data tables may be calculated for processing the transformed query for hash column chunks 4-6, 7-9, and 10-12, respectively.

It may then be determined at step 808 to combine the intermediate results at second-level query processing servers in the hierarchy of query processing servers. For instance, intermediate results from query processing server QP3 processing the query for hash column chunks 1-3 and intermediate results from query processing server QP4 processing the query for hash column chunks 4-6 may be combined into table QP1_H4_H6. At step 810, it may be determined to assign one or more query processing servers for combining the intermediate results.

After determining to combine intermediate results from processing the transformed query and assigning one or more query processing servers for combining intermediate results, it may be determined at step 812 to provide instructions for sending results from first-level query processing servers to second-level query processing servers. For example, the query processing server receiving the query may direct QP2 to combine intermediate results for the group of first-level query processing servers. For instance, the following SQL statement may be generated for directing query processing server QP2 to combine intermediate results from query processing server QP4 processing the query for hash column chunks 1-3 and intermediate results from query processing server QP3 processing the query for hash column chunks 4-6:

SELECT C1, C2
INTO QP2_H1_H6
FROM QP1_H1_H3
UNION
SELECT C1, C2
FROM QP1_H4_H6.

After it may be determined to provide instructions for combining results from first-level query processing servers at second-level query processing servers, processing may be finished for distributing processing of a query referencing column chunks in the column chunk data store.

Figure 9:
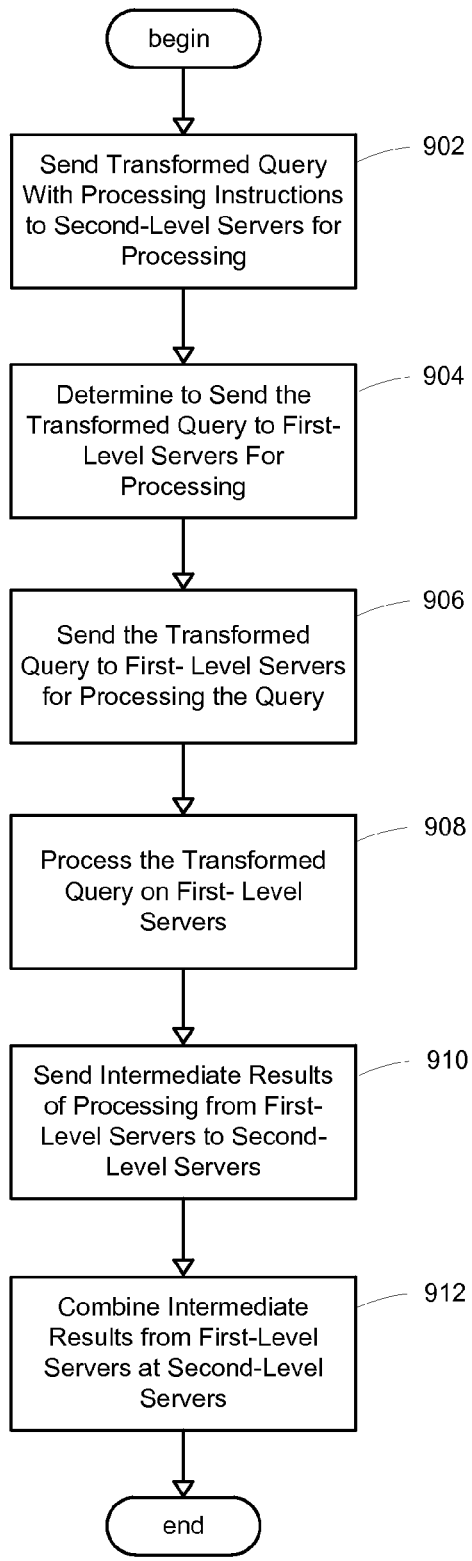
FIG. 9 is a flowchart generally representing the steps undertaken in one embodiment for processing a query distributed among multiple servers in the column chunk data store, in accordance with an aspect of the present invention.

FIG. 9 presents a flowchart generally representing the steps undertaken in one embodiment for processing a query distributed among multiple servers in the column chunk data store. At step 902, a transformed query may be sent with processing instructions to second-level query processing servers for execution. For example, the following SQL statements may be sent to query processing server QP2 to direct query processing server QP2 to send query execution steps to other query processing servers:

```
PARALLEL ON {QP4, QP3, QP3, QP4}
    WITH {1-3, 4-6, 7-9, 10-12}
BEGIN
SELECT C1, C2
INTO Q1_Hx_Hy
FROM T1, T2
WHERE T1.C1 = T2.C1
AND T1.C3 = T2.C2
AND T1._HASH ≥ x AND T1._HASH ≤ y.
```

At step 904, it may be determined to send the transformed query to first-level query processing servers for processing. For example, query processing server QP2 may be directed to send multiple transformed query requests to other query processing servers such as QP3 and QP4 for processing the transformed query in parallel. The multiple transformed query requests may be sent to the first-level storage servers for processing at step 906. For example, the following transformed query request may be sent to query processing server QP4:

```
SELECT C1, C2
INTO Q1_H01_H03
FROM T1, T2
WHERE T1.C1 = T2.C1
AND T1.C3 = T2.C2
AND T1._HASH ≥ 1 AND T1._HASH ≤ 3.
```

At step 908, the transformed query request may be processed on the first-level query processing servers. For instance, to process the transformed query sent to query processing server QP4 in the preceding example, query processing server QP4 may retrieve column chunks T1.D1.H01.C1 and T1.D1.H01.C3 from storage server S1; query processing server QP4 may retrieve column chunks T1.D1.H02.C1 and T1.D1.H02.C3 from storage server S2; and query processing server QP4 may retrieve column chunks T1.D1.H03.C1 and T1.D1.H03.C3 from storage server S3. After retrieving any column chunks that may not be locally cached, query processing server QP4 may then evaluate the expression T1.C1=T2.C1 AND T1.C3=T2.C2. Similarly, one or more other transformed queries may be sent in various embodiments to one or more other query processing servers that may respectively process any received transformed queries.

At step 910, intermediate results of processing the transformed query on first-level query processing servers may be sent to second-level query processing servers and may be combined at step 912 on the second-level query processing servers. For example, query processing server QP2 may combine intermediate results of query processing server QP4 processing the query for hash column chunks 1-3 and QP3 processing the query for hash column chunks 4-6 into table QP1_H4_H6. After the intermediate results of processing the transformed queries on the first-level query processing servers may be combined at the second-level query processing servers, processing may be finished for processing a query distributed among multiple servers in the column chunk data store.

Thus the present invention may flexibly distribute query processing among multiple query processing servers. The hierarchy of servers determined for performing distributed processing of a query may be selected based upon any number of criteria, including the location of cached column chunks referenced by the query, characteristics of the server such as the sorting speed, the processor speed, the I/O throughput, and so forth. Moreover, query processing may also be performed in various embodiments by storage servers in the column chunk data store. This advantageously may provide additional flexibility in determining which servers may most efficiently process a query and reduce transmission of column chunks among query processing servers and storage servers in the column chunk data store.

As can be seen from the foregoing detailed description, the present invention provides an improved system and method for query processing in a distributed column chunk data store. Any data table may be flexibly partitioned into column chunks by applying various partitioning methods using one or more columns as a key, including range partitioning, list partitioning, hash partitioning, and/or combinations of these partitioning methods. Upon receiving a request to process a query about data stored in the column chunk data store, a hierarchy of servers may then be dynamically determined to process execution steps of the query transformed for distributed processing. In this way, multiple servers may process the transformed query in parallel and may combine intermediate results obtained from distributed processing of execution steps for the transformed query. Such a system and method support storing and querying detailed data needed by data mining, segmentation and business intelligence applications over long periods of time. As a result, the system and method provide significant advantages and benefits needed in contemporary computing, and more particularly in data mining and business intelligence applications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method implemented on at least one machine, each of which has at least one processor, storage, and a communication platform, comprising:

accessing, at a first query processing server, a query for data of a table comprising a plurality of columns and a plurality of rows, wherein:

the table has been partitioned into a plurality of column chunks by independently partitioning each column of the table into two or more column chunks based on a predetermined partitioning policy, the predetermined partitioning policy comprising information related to the number of column chunks into which the each column of the table should be partitioned;

a plurality of parity column chunks are created, each parity column chunk being created based on two or more column chunks of the plurality of column chunks; and the plurality of column chunks and the plurality of parity column chunks have been distributed and stored across a plurality of storage servers;

transforming, by the first query processing server, the query into a plurality of sub-queries;

distributing, by the first query processing server, the plurality of sub-queries to a plurality of second query processing servers;

receiving, at the first query processing server, the data from the plurality of second query processing servers; and transmitting, by the first query processing server, the data in response to the query.

2. The method of claim 1, further comprising validating, by the first query processing server, syntax and semantic content of the query.

3. The method of claim 1, further comprising:
determining, at the plurality of second query processing servers, one or more execution steps for each sub-query;
distributing, by the plurality of second query processing servers, the one or more execution steps determined for each sub-query to the plurality of third query processing servers;
receiving, at the plurality of second query processing servers, one or more sub-results for each sub-query from the plurality of third query processing servers;
combining, at the plurality of second query processing servers, the one or more sub-results for each sub-query to construct the data; and
transmitting, by the plurality of second query processing servers, the data to the first query processing server.

4. The method of claim 3, wherein when distributing the one or more execution steps determined for each sub-query to the plurality of third query processing servers, for each sub-query, if one or more of the plurality of third query processing servers cache one or more of the plurality of column chunks referenced by the sub-query, then distributing the one or more execution steps determined for the sub-query to the one or more of the plurality of third query processing servers.

5. The method of claim 3, further comprising:
executing, at the plurality of third query processing servers, the one or more execution steps for each sub-query to retrieve the one or more sub-results for each sub-query from the plurality of storage servers; and
transmitting, by the plurality of third query processing servers, the one or more sub-results for each sub-query to the plurality of second query processing servers.

6. The method of claim 5, wherein the one or more execution steps for each sub-query are executed in parallel at the plurality of third query processing servers.

7. The method of claim 1, further comprising:
determining, at the plurality of second query processing servers, one or more execution steps for each sub-query;
distributing, by the plurality of second query processing servers, the one or more execution steps determined for each sub-query to the plurality of storage servers;
receiving, at the plurality of second query processing servers, one or more sub-results for each sub-query from the plurality of storage servers;
combining, at the plurality of second query processing servers, the one or more sub-results for each sub-query to construct the data; and
transmitting, by the plurality of second query processing servers, the data to the first query processing server.

8. The method of claim 7, further comprising:
executing, at the plurality of storage servers, the one or more execution steps for each sub-query to retrieve the one or more sub-results for each sub-query; and
transmitting, by the plurality of storage servers, the one or more sub-results for each sub-query to the plurality of second query processing servers.

9. The method of claim 1, further comprising:
computing the plurality of parity column chunks using the plurality of column chunks, wherein each parity column chunk is computed by performing a bitwise XOR on the two or more column chunks; and
distributing and storing the plurality of parity column chunks across the plurality of storage servers, wherein each parity column chunk is stored at a storage server where the two or more column chunks used to compute the parity column chunk are not stored.

10. The method of claim 1, wherein one or more of the plurality of column chunks stored in the plurality of storage servers have been compressed.

11. A method implemented on at least one machine, each of which has at least one processor, storage, and a communication platform, comprising:
accessing, at a first query processing server, a query for data of a table comprising a plurality of columns and a plurality of rows, wherein:
the table has been partitioned into a plurality of column chunks by independently partitioning each column of the table into two or more column chunks based on a predetermined partitioning policy, the predetermined partitioning policy comprising information related to the number of column chunks into which the each column of the table should be partitioned;
a plurality of parity column chunks are created, each parity column chunk being created based on two or more column chunks of the plurality of column chunks;
the plurality of column chunks and the plurality of parity column chunks have been distributed and stored across a plurality of storage servers; and
one or more of the plurality of column chunks have been cached at the first query processing server;
transforming, by the first query processing server, the query into a plurality of sub-queries, wherein each sub-query references a portion of the data;
separating, by the first query processing server, the plurality of sub-queries into one or more first sub-queries and one or more second sub-queries, wherein each first sub-query references one or more of the plurality of column chunks that have been cached at the first query processing server, and each second sub-query references one or more of the plurality of column chunks that have not been cached at the first query processing server;
distributing, by the first query processing server, the one or more second sub-queries to a plurality of second query processing servers;
processing, by the first query processing server, the one or more first sub-queries using the one or more of the plurality of column chunks cached at the first query processing server to determine a sub-result for each first sub-query;
transmitting, by the first query processing server, the sub-result determined for each first sub-query to the plurality of second query processing servers;
receiving, at the first query processing server, the data from the plurality of second query processing servers; and
transmitting, by the first query processing server, the data in response to the query.

12. The method of claim 11, further comprising validating, by the first query processing server, syntax and semantic content of the query.

13. The method of claim 11, further comprising:
determining, at the plurality of second query processing servers, one or more execution steps for each second sub-query;
distributing, by the plurality of second query processing servers, the one or more execution steps determined for each second sub-query to a plurality of third query processing servers;

receiving, at the plurality of second query processing servers, one or more sub-results for each second sub-query from the plurality of third query processing servers;

combining, at the plurality of second query processing servers, the sub-result for each first sub-query and the one or more sub-results for each second sub-query to construct the data; and transmitting, by the plurality of second query processing servers, the data to the first query processing server.

14. The method of claim 13, further comprising:

executing, at the plurality of third query processing servers, the one or more execution steps for each second sub-query to retrieve the one or more sub-results for each second sub-query from the plurality of storage servers; and transmitting, by the plurality of third query processing servers, the one or more sub-results for each second sub-query to the plurality of second query processing servers.

15. The method of claim 14, wherein the one or more execution steps for each second sub-query are executed in parallel at the plurality of third query processing servers.

16. The method of claim 11, further comprising:

determining, at the plurality of second query processing servers, one or more execution steps for each second sub-query;

distributing, by the plurality of second query processing servers, the one or more execution steps determined for each second sub-query to the plurality of storage servers;

receiving, at the plurality of second query processing servers, one or more sub-results for each second sub-query from the plurality of storage servers;

combining, at the plurality of second query processing servers, the sub-result for each first sub-query and the one or more sub-results for each second sub-query to construct the data; and transmitting, by the plurality of second query processing servers, the data to the first query processing server.

17. The method of claim 11, further comprising:

computing a plurality of parity column chunks using the plurality of column chunks, wherein each parity column chunk is computed by performing a bitwise XOR on the two or more column chunks; and distributing and storing the plurality of parity column chunks across the plurality of storage servers, wherein each parity column chunk is stored at a storage server where the two or more column chunks used to compute the parity column chunk are not stored.

18. A computer-readable non-transitory storage medium storing computer-readable instructions that, when executed by one or more processors, cause a first query processing server to:

access a query for data of a table comprising a plurality of columns and a plurality of rows, wherein:

the table has been partitioned into a plurality of column chunks by independently partitioning each column of the table into two or more column chunks based on a predetermined partitioning policy, the predetermined partitioning policy comprising information related to the number of column chunks into which the each column of the table should be partitioned;

a plurality of parity column chunks are created, each parity column chunk being created based on two or more column chunks of the plurality of column chunks; and the plurality of column chunks and the plurality of parity column chunks have been distributed and stored across a plurality of storage servers;

transform the query into a plurality of sub-queries; distribute the plurality of sub-queries to a plurality of second query processing servers;

receive the data from the plurality of second query processing servers; and transmit the data in response to the query.

19. The media of claim 18, wherein the computer-readable instructions further causes the first query processing server to:

compute the plurality of parity column chunks using the plurality of column chunks, wherein each parity column chunk is computed by performing a bitwise XOR on the two or more column chunks; and distribute and storing the plurality of parity column chunks across the plurality of storage servers, wherein each parity column chunk is stored at a storage server where the two or more column chunks used to compute the parity column chunk are not stored.

* * * * *